United States Patent [19]
David et al.

[11] Patent Number: 5,498,667
[45] Date of Patent: Mar. 12, 1996

[54] THERMOPLASTIC COMPOSITION AND METHOD FOR PRODUCING THERMOPLASTIC COMPOSITION BY MELT BLENDING CARPET

[75] Inventors: Donald J. David, Amherst, Mass.; Jerauld L. Dickerson, Pensacola, Fla.; Thomas F. Sincock, Weatogue, Conn.; Susan R. Williams, Pace, Fla.

[73] Assignee: Monsanto Company, St. Louis, Mo.

[21] Appl. No.: 397,607

[22] Filed: Mar. 2, 1995

Related U.S. Application Data

[60] Continuation-in-part of Ser. No. 132,332, Oct. 6, 1993, abandoned, which is a division of Ser. No. 37,140, Mar. 25, 1993, Pat. No. 5,294,384.

[51] Int. Cl.$^6$ .............................. B29B 17/00; B29C 47/00
[52] U.S. Cl. ........................... 525/166; 525/167; 264/37; 264/143
[58] Field of Search .................................. 525/166, 167; 264/37, 143

[56] References Cited

U.S. PATENT DOCUMENTS

| | | | |
|---|---|---|---|
| 3,562,373 | 2/1971 | Logrippo | 264/118 |
| 4,020,020 | 4/1977 | Appleyard et al. | 260/2.3 |
| 4,028,159 | 6/1977 | Norris | 156/94 |
| 4,105,593 | 8/1978 | Stavrinou | 260/2.3 |
| 4,158,646 | 6/1979 | Benkowski et al. | 260/2.3 |
| 4,546,128 | 10/1985 | Nakajima | 523/222 |
| 4,775,697 | 10/1988 | Schoenhard | 521/48 |
| 4,795,782 | 1/1989 | Lutz et al. | 525/66 |
| 5,061,735 | 10/1991 | Zielinski | 521/46.5 |
| 5,145,617 | 9/1992 | Hermanson et al. | 264/37 |
| 5,169,870 | 12/1992 | Corbin et al. | 521/49.8 |
| 5,240,530 | 8/1993 | Fink | 156/94 |
| 5,278,231 | 1/1994 | Chundury | 525/66 |
| 5,288,349 | 2/1994 | Fink | 156/72 |
| 5,294,384 | 3/1994 | David | 264/37 |

FOREIGN PATENT DOCUMENTS

| | | |
|---|---|---|
| 547533 | 6/1993 | European Pat. Off. . |
| 2491824 | 4/1982 | France . |
| 2425751 | 12/1975 | Germany . |
| 3816894 | 11/1989 | Germany . |
| 54-117579 | 9/1979 | Japan . |
| 58-119821 | 7/1983 | Japan . |
| 60-185823 | 9/1985 | Japan . |
| 60-206868 | 10/1985 | Japan . |
| 60-219016 | 11/1985 | Japan . |
| 61-169221 | 7/1986 | Japan . |
| 63-057355 | 3/1988 | Japan . |
| 5-032888 | 2/1993 | Japan . |
| 5293828 | 11/1993 | Japan . |
| 5287139 | 11/1993 | Japan . |
| WO9312285 | 6/1993 | WIPO . |

OTHER PUBLICATIONS

"Carpet Recycling is Here!", Midwest Retailer, Jul. 1992.
"Carpets From Plastic Waste", Soviet Technology Alert, Mar. 1988.
"A New Technology for Recycling Carpet Waste", R. H. Wagner, Chemiefasern/Textilindustrie, vol. 28/80, Jul. 1978.
RD 19524—Reclamation of Mixed Textiles Waste, Disclosed by Ryburn Foam Ltd, Jul. 10, 1980.
A. Watzl—Recycling of Textile Waste Into Nonwovens Products, May 1992, International Textile Reports.
R. Malloy, et al. Reclamation of Automotive Carpet Scrap, Mar. 29, 1992.

Primary Examiner—Joseph L. Schofer
Assistant Examiner—I. Zemel

[57] ABSTRACT

The present invention is directed to a process for forming a thermoplastic composition from carpet wherein a carpet sample are melt blended without separating the carpet into its component parts. The process of the present invention produces a thermoplastic composition useful as a substitute for virgin thermoplastics in a variety of applications.

9 Claims, 1 Drawing Sheet

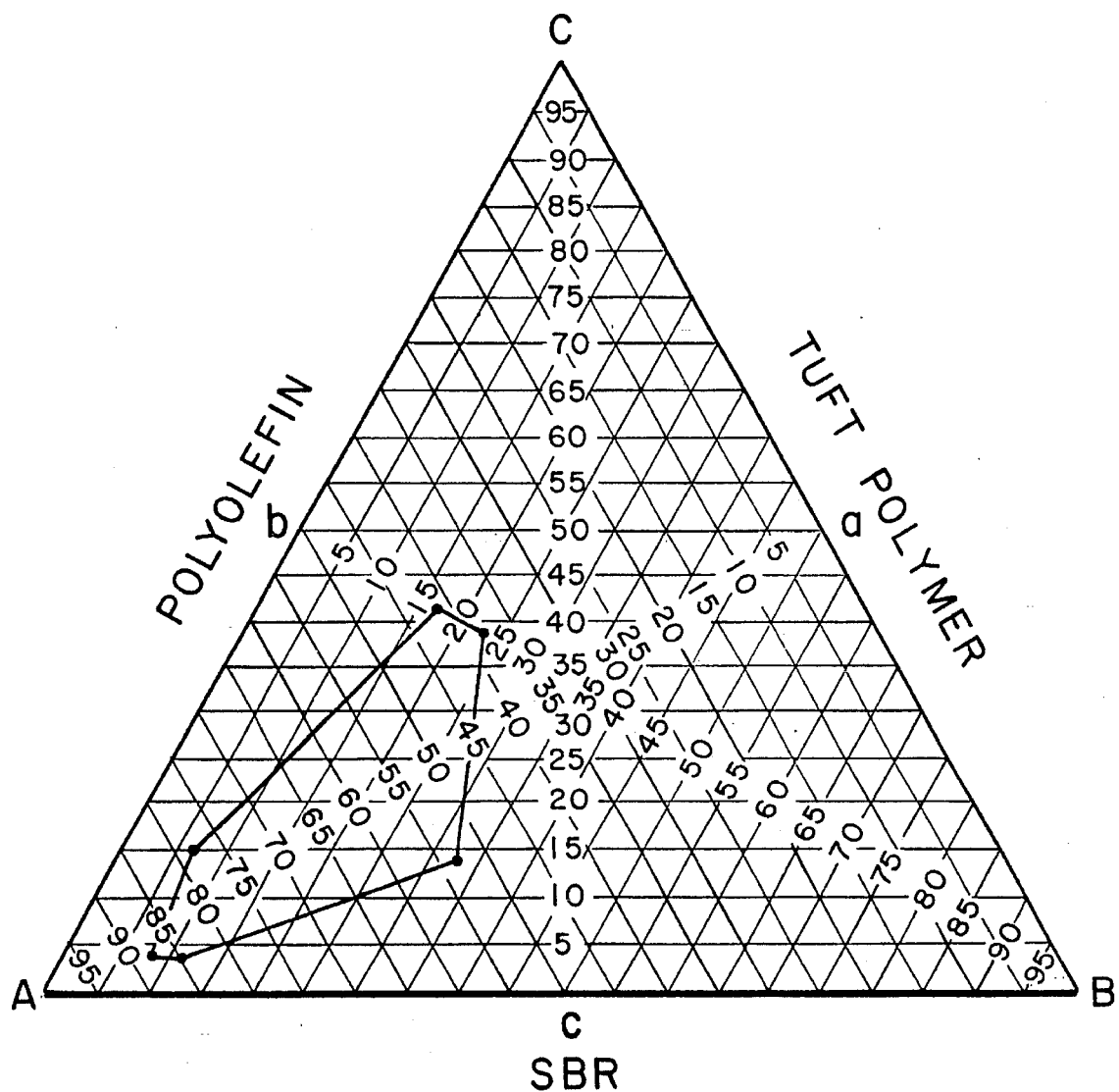

THERMOPLASTIC COMPOSITION AND METHOD FOR PRODUCING THERMOPLASTIC COMPOSITION BY MELT BLENDING CARPET

PRIOR APPLICATION

The present application is a continuation-in-part of U.S. Ser. No. 08/132,332, filed Oct. 6, 1993, now abandoned, which in turn is a division of U.S. Ser. No 08/037,140, filed Mar. 25, 1993, now U.S. Pat. No. 5,294,384.

BACKGROUND OF THE INVENTION

1. Field of the Invention

The present invention is directed to a method for producing a thermoplastic composition by melt blending carpet without separating it into its various components. More specifically, the present invention is directed to a method for producing a useful thermoplastic composition from used carpet as well as thermoplastic composition produced by the subject process.

2. Description of the Prior Art

For many years, disposal of waste materials has been conducted in ways detrimental to the environment. It has been burned in massive incinerators thereby polluting the air. It has been dumped into the ocean thereby contaminating the water supply. It has been buried in landfills where it collects without decomposing for years.

In recent times, individuals and corporations alike have expended significant effort on identifying environmentally responsible methods for disposing of waste products constructed from synthetic materials such as resins and plastics. One important direction taken along this line is the development of programs for collecting the synthetic materials for recycling and re-use in other products.

Many useful products, including flooring materials, are currently manufactured from a number of different synthetic materials which have varying physical and chemical characteristics. For example, conventional nylon carpeting includes three primary components: a plurality of tufts formed from nylon, at least one backing formed from a polyolefin such as polypropylene and an adhesive material of styrene-butadiene rubber (SBR) applied as a latex and typically filled with an inorganic filler such as calcium carbonate. Similarly, conventional polyester carpeting includes three primary components: a plurality of tufts formed from a polyester, for example polyethylene terephthalate or a copolymer thereof; at least one backing formed from a polyolefin, for example polypropylene; and an adhesive material, for example styrene-butadiene rubber (SBR) applied as a latex and typically filled with an inorganic filler such as calcium carbonate. Also, conventional polypropylene carpeting includes three primary components: a plurality of tufts formed from polypropylene; at least one backing formed from a polyolefin, for example polypropylene; and an adhesive material, for example styrene-butadiene rubber (SBR) applied as a latex and typically filled with an inorganic filler such as calcium carbonate. These products present particularly difficult challenges to recycling efforts because of the varying chemical and physical characteristics of their individual components in their different forms.

The success of attempts to recycle such multi-component products has been severely limited. For example, U.S. Pat. Nos. 4,158,646 and 5,145,617 disclose methods for reprocessing fiber-containing waste materials wherein the process results in a fiber-containing final product. These type of processes are restricted in utility to the limited application where composite (fiber/matrix) materials are useful.

Still other processes focus on separating out the individual components. Specifically, efforts in reclaiming or recycling carpet materials, such as that disclosed in U.S. Pat. Nos. 4,028,159 and 5,169,870, involve separating the individual materials through various processing steps and recovering the material for reuse. These methods, while effective in reclaiming individual synthetic materials, are extremely expensive to the extent of often being cost prohibitive. Further, the additional energy required to effect the necessary processing steps at least partially reduces the environmental advantage of recycling or reclaiming.

A need therefore exists for a method for processing used carpet into a useful material without the disadvantages described above.

BRIEF SUMMARY OF THE INVENTION

The present invention meets this need and achieves the additional advantages set forth below by providing a method for recycling conventional carpet into a thermoplastic composition useful in a variety of conventional thermoplastic resin applications. The process includes providing an unseparated carpet sample and forming a melt blend of the unseparated carpet material under conditions of temperature, pressure and intensive mixing sufficient to produce a composition which exhibits thermoplastic properties. The resulting thermoplastic composition is characterized by properties which parallel those found in virgin thermoplastic materials and therefore maybe used in a variety of applications.

BRIEF DESCRIPTION OF THE DRAWING

FIG. 1 is a diagrammatical representation of the respective percentage amounts of the polymeric components which are included in the composition of the present invention, with the percentages based on the total weight of the polymeric components.

DETAILED DESCRIPTION OF THE PREFERRED EMBODIMENT

The process of the present invention is useful for converting carpet into a thermoplastic material formed from a melt blend of the materials which originally comprised the carpet. The first step in the process therefore is providing at least one unseparated carpet sample for processing. An "unseparated" carpet sample is one that has not been modified to remove or separate out one or more of its primary components (tufts, backing[s] and adhesive) from the sample prior to processing.

The carpet sample is preferably a conventional sample of carpet comprising nylon tufts (most preferably tufts formed from nylon 6 or nylon 6,6 or blends or copolymers thereof), at least one polyolefin backing material and a styrene-butadiene rubber (SBR) adhesive originally applied as a latex. Such carpet constructions are well known in the art and are exemplified in U.S. Pat. No. 4,643,930. The carpet sample may also be a conventional carpet sample including polyester tufts (most preferably tufts formed from polyethylene terephthalate [PET], polybutylene terephthalate [PBT], or blends and/or copolymers thereof) or polypropylene tufts; at least one polyolefin backing material; and a styrene-butadiene rubber (SBR) originally applied as a latex. Such carpet constructions are well known in the art and are exemplified in U.S. Pat. No. 5,102,713. The carpet sample may also contain coating materials, treatment compositions or additives which impart soil resistance, stain resistance, luster modification or other desirable characteristics.

The carpet sample is most preferably a post-consumer or used carpet. The used carpet sample should be reasonably free from dirt, dust or other contaminants, although a limited amount of these contaminants present in the sample will not affect the processing of the sample or the properties of the final product. In this preferred embodiment, the process of the present invention provides a process for recycling previously used carpet into a useful thermoplastic composition.

The process of the present invention may also be used for converting other carpet samples into a useful thermoplastic material. For example, the sample may be a carpet sample which was originally manufactured with some type of defect and is therefore unacceptable for sale. Also, the carpet sample may be a carpet returned to the manufacturer by the purchaser as an unacceptable product.

The carpet sample may have any pile weight currently available in the marketplace. Preferably, the carpet sample has a pile weight of from about 16 oz/yd$^2$ (540 g/m$^2$) to about 80 oz/yd$^2$ (2710 g/m$^2$). A particularly useful thermoplastic composition is formed by the process of the present invention when the carpet sample has a pile weight of about 40 oz/yd$^2$ (1360 g/m$^2$), a backing weight of about 8 oz/yd$^2$ (270 g/m$^2$) and an adhesive weight (SBR latex and filler) of 24 oz/yd$^2$ (810 g/m$^2$). The carpet sample may also comprise a combination of two or more carpet samples having different pile weights, origins, etc.

The next step in the process of the present invention is melt blending the carpet sample into a composition of the materials present in the carpet sample. This step is performed under conditions of temperature, pressure and intensive mixing sufficient to produce a thermoplastic composition wherein all polymeric components from the carpet sample are reduced to a flowable, liquid form without substantial degradation. Specific conditions for the melt blending step will depend on the materials present in the carpet sample. This step is preferably performed at a temperature of from about 180° C. to about 280° C., a pressure of from about 350 to about 450 psi, and a shear rate of about 200 to 400 sec$^{-1}$. Preferred devices for use in performing the melt blending step include conventional twin-screw extruders such as that commercially available as Model HTO.8 manufactured by Welding Engineers, Inc. or conventional single-screw extruders such as that commercially available from Killion. Other devices may also be utilized to perform this step so long as they are able to operate at conditions sufficient to produce a thermoplastic composition as described above. Depending on the dimensions of the carpet sample and the device used in the conversion step, the carpet sample maybe divided into a plurality of smaller samples which are more easily and conveniently fed into the device.

Applicants have unexpectedly discovered that the process of the present invention produces a useful blend of the components found in the carpet sample. Preferably, this process is conducted in the absence of a separately added compatabilizer. A compatabilizer is characterized as having separate portions of its molecule each of which is soluble in one of two immiscible phases. For example, nylon, a polar polymer popularly used in carpet tufts, is thought to be incompatible with nonpolar materials such as polyolefins such that it would be expected that a compatabilizer would be necessary to melt blend these materials. However, the present invention in its preferred embodiment surprisingly provides a process for producing a blend of such materials without supplying a separate compatibilizer during the melt blending step or as part of a separate step. Such compatibilizers may optionally be added, however, at the time of, prior to or subsequent to and separate from blending to enhance modulus or other properties of the final product.

The compatabilizer is added preferably in the amount of from 0% to 10% by weight based on the weight of the carpet sample.

The blend formed as described above may next be processed into a form more convenient for commercial application and transportation. In the preferred embodiment, the blend is pelletized by conventional method such as passing the blend through a strand die, water bath and chopper assembled in-line with the extruder. The blend may also be processed into other commercially acceptable forms, such as granules or powders, by using well-known and conventional methods and devices.

As the carpet sample is processed in unseparated form, the resulting composition includes each of the components of the carpet sample. The composition therefore includes a tuft polymer selected from the group consisting of polyester and polypropylene; a polyolefin; and styrene-butadiene rubber (SBR). The composition is substantially free of the fiber form of the polymeric components of the sample and is useful "as is" without combining it with virgin materials. The composition preferably includes the following polymeric components, with all percentages by weight based on the total weight of the polymeric components:

| Tuft Polymer | 41–88% |
|---|---|
| Polyolefin | 7–33% |
| SBR | 4–41% |

The specific make-up of the composition, as well as its specific qualities and parametric values, is dependent upon the construction of the carpet sample, most specifically the pile weight. For the process which converts a carpet sample having a pile weight of about 40 oz/yd$^2$ (1360 g/m$^2$), a backing weight of 8 oz/yd$^2$ (270 g/m$^2$) and an adhesive weight (SBR latex plus filler) of 24 oz/yd$^2$ (810 g/m$^2$), the resulting composition includes the following polymeric components based on the total weight of the polymeric components:

| Tuft Polymer | 74% |
|---|---|
| Polyolefin | 15% |
| SBR | 11% |

As SBR adhesives typically utilized in conventional carpet systems include an inorganic filler such as calcium carbonate, the composition of the present invention most preferably further includes from about 10% to about 40% by weight of an inorganic filler based on the weight of the composition such that the composition includes the following, by weight based on the total weight of the composition:

| Tuft Polymer | 25 to 81% |
|---|---|
| Polyolefin | 6 to 26% |
| SBR | 3 to 34% |
| Inorganic Filler | 7 to 45% |

For a carpet sample having a pile weight of oz/yd$^2$ (1360 g/m$^2$), a backing weight of 8 oz/yd$^2$ (270 g/m$^2$) and an adhesive weight (SBR latex plus filler of 24 oz/yd$^2$ (810 g/m$^2$), the composition includes the following, by weight based on the total weight of the composition:

| | |
|---|---|
| Tuft Polymer | 56% |
| Polyolefin | 11% |
| SBR | 8% |
| Inorganic Filler | 25% |

The following examples, while not intended to be limiting, provide a detailed illustration of the process of the present invention.

EXAMPLE 1

A 50 lb. (22.68 kg) sample of carpet having a conventional construction of nylon 6,6 tufts, polypropylene backing and calcium-carbonate filled styrene-butadiene rubber (SBR) adhesive originally applied as a latex was procured. The carpet sample had a brown color and a pile weight of 28 oz/yd$^2$ (950 g/m$^2$).

The carpet sample was cut into one-inch wide strips using a sheet metal shear and the resulting strips were fed directly into the throat of a counter-rotating, non-intermeshing, twin-screw extruder operating at about 250° C. and 240 RPM. The melt blended sample was then passed through a conventional strand die, water bath and chopper to produce good quality pellets. The pellets were dried overnight at 90° C. and then molded with an Arburg Model 320 injection molder into specimens for use in the tensile and impact tests set forth below. A 26 gram dry powder scoop was also formed by conventional molding techniques.

EXAMPLE 2

A 50 lb. ( 22.68 kg ) sample of carpet having a conventional construction of nylon 6,6 tufts, polypropylene backing and calcium-carbonate filled SBR latex adhesive was subjected to the processes described in Example 1. The carpet sample had a blue color and a pile weight of 40 oz/yd$^2$ (1360 g/m$^2$).

EXAMPLE 3

A 50 lb. (22.68 kg) sample of carpet having a conventional construction of nylon 6,6 tufts, polypropylene backing and calcium-carbonate filled SBR latex adhesive was subjected to the processes described in Example 1. The carpet sample had a red color and a pile weight of 40 oz/yd$^2$ (1360 g/m$^2$).

In a control example, specimens of virgin polystyrene were also molded by conventional techniques for use in the tensile and impact tests set forth below.

EXAMPLE 4

A 40 lb. (18.14 kg) sample of carpet having a conventional construction of polyester (PET) tufts, polypropylene backing and calcium carbonate filled styrene-butadiene rubber (SBR) adhesive originally applied as latex was procured. The carpet sample had a beige color and a pile weight of about 44 oz/yd$^2$ (1490 g/m$^2$).

The carpet sample was cut into one-inch wide strips using a sheet metal shear and the resulting strips were dried overnight at 100° C. The dried strips were fed directly into the throat of a non-vented, single screw extruder operating at a barrel temperature of about 265° C. and a speed of about 43 rpm. The melt blended sample was then passed through a conventional strand die, water bath and chopper to produce pellets. The pellets were dried for 8 hours at 100° C. and then molded using a Newbury 200 injection molder into specimens for use in the tensile and impact tests set forth below.

EXAMPLE 5

A 40 lb. (18.14 kg) sample of carpet having a conventional construction of polypropylene (PP) tufts, polypropylene backing and calcium carbonate filled styrene-butadiene rubber (SBR) adhesive originally applied as latex was procured. The carpet sample had a beige color and a pile weight of 40 oz/yd$^2$ (1360 g/m$^2$).

The carpet sample was cut into one-inch wide strips using a sheet metal shear and the resulting strips were fed directly into the throat of a single screw extruder operating at a barrel temperature of from about 180° C. to 205° C. and a speed of about 43 rpm. The melt blended sample was then passed through a conventional strand die, water bath and chopper to produce pellets. The pellets were dried for 6 hours at 100° C. and then molded using a Newbury 200 injection molder into specimens for use in the tensile and impact tests set forth below.

Molded test specimens formed for use in specific tensile tests listed below were then tested in accordance with ASTMD-638 for tensile properties. The results are listed in Table 1 below:

TABLE 1

| | Tensile Properties | | | |
|---|---|---|---|---|
| Sample | Stress @ Yield, psi/MPa | Stress @ Fail, psi/MPa | Young's Modulus, psi/MPa | % Elongation @ fail |
| Example 1 | 4490/30.95 | 4428/30.53 | 322,700/2224.69 | 4.54 |
| Example 2 | 4468/30.80 | 4443/30.63 | 304,300/2097.84 | 6.65 |
| Example 3 | 3773/26.01 | 3743/25.80 | 297,700/2052.34 | 6.68 |
| Example 4 | — | 3510/24.20 | 386,000/2661.08 | 1.83 |
| Example 5 | 1960/13.51 | 1870/12.89 | 253,750/1749.35 | 11.03 |
| Control (Polystyrene) | 5000/34.47 | 5200/35.85 | 400,000/2757.60 | 2–3 |

The test specimens previously formed for use in the specific impact tests discussed below were then tested in accordance with the procedures set forth in these tests.

1. Notched Izod Impact, ASTM D-256-70; room temperature sample bar cross section of 3.2 mm× 12.5 mm. Notched Izod Impact Classification Rating (Room temperature) on which performance is based is:

| | | |
|---|---|---|
| Low | 0.1–1.5 ft. lbs./in. | (0.053–0.795 J/cm) |
| Medium | 1.51–4.0 ft. lbs./in. | (0.80–2.1 J/cm) |
| High | 4.1–9.0 ft. lbs./in. | (2.2–4.77 J/cm) |
| Super Tough | 9.1–20+ ft. lbs./in. | (4.8–10.6+ J/cm) |

2. Inverted Dart Impact (IDI)—a multiaxial, high speed, impact test. The test specimen was 2"×2"×0. 075" ( 5 cm×5 cm×0.2 cm) prepared by injection or compression molding. Specimens were temperature and relative humidity conditioned for 24 hours prior to testing. The IDI machine used a moving specimen clamp which is driven over a fixed dart attached to a load measuring cell. The load cell output is processed by computer which integrates the impact energy and outputs the result at failure. Specimen temperature was 20° C. and impact speed was 8000 in/min (203.2 m/min). Ten specimens constitute a representative of a formulation with the result reported being the average for the set.

IDI Classification Rating (20° C.) on which performance is based is:

| Low | 0–100 in. lbs. | ( 0–11.2 J) |
|---|---|---|
| Medium | 101–200 in. lbs. | (11.3–22.4 J) |
| High | 201–300 in. lbs. | (22.5–33.7 J) |
| Super Tough | 301–500 in. lbs. | (33.8–56.2 J) |

The results of these impact tests are shown in Table 2 below:

TABLE 2

| Sample | Impact Properties | |
|---|---|---|
| | Izod ⅛" Notch, ft.–lbs./inch (J/m) | IDI, inch–lbs. @ Fail (J) |
| Example 1 | 0.76 (40.89) | 20.8 (2.33) |
| Example 2 | 1.05 (56.49) | 26.3 (2.94) |
| Example 3 | 1.05 (56.49) | 34.0 (3.81) |
| Example 4 | 0.3440 (18.51) | — |
| Example 5 | 0.4060 (21.84) | — |
| Control (Polystyrene) | 0.4 (21.52) | 20 (2.24) |

As demonstrated above, the process of the present invention produces a composition which exhibits thermoplastic characteristics and is therefore useful in a variety of applications. The specific applications for which these materials are useful are dependent on the specific characteristics of each material. These characteristics may vary slightly depending on the specific characteristics of the carpet sample, such as pile weight. In general, the materials produced by the process of the present invention are useful as substitutes for virgin thermoplastic materials as their characteristics as shown above are comparable to the virgin material.

As a substitute, the material of the present invention is preferably used alone in thermoplastic applications such as those described above; however, it may optionally be combined with virgin thermoplastics to provide a blend having characteristics customized to a particular end use.

While the detailed description of the present invention has been set forth above in detail, it is to be understood that various modifications which do not depart from the spirit and scope of the present invention may be made. For example, additives which modify the properties of the thermoplastic material produced by the process of the present invention may optionally be added prior to or during the step wherein the carpet sample is converted into the blend. Examples of such additives include antimicrobials, lubricants, antioxidants, pigments, and the like.

We claim:

1. A process for forming a thermoplastic composition from at least one carpet sample comprising a plurality of polymeric components, said sample including a plurality of polyester or polypropylene tufts, at least one polyolefin backing, and styrene-butadiene rubber adhesive, said process comprising the steps of:

(a) providing at least one unseparated carpet sample; and (b) melt blending said unseparated carpet sample under conditions of temperature, pressure and intensive mixing sufficient to produce a thermoplastic composition wherein all of said polymeric components are reduced to a flowable liquid form.

2. A process in accordance with claim 1 wherein said melt blending step is performed at a temperature of from about 180° C. to about 280° C.

3. A process in accordance with claim 2 wherein said melt blending step is performed at a pressure of about 350 psi to about 450 psi.

4. A process in accordance with claim 3 wherein said melt blending step is performed at a shear rate of between about 200 to about 400 sec$^{-1}$.

5. A process in accordance with claim 4 wherein said melt blending step is conducted in an extruder.

6. A process in accordance with claim 1 wherein said carpet sample is used carpet.

7. A process in accordance with claim 1 wherein said carpet sample comprises a plurality of polyester tufts, at least one polyolefin backing and styrene-butadiene rubber adhesive.

8. A process in accordance with claim 1 wherein said carpet comprises a plurality of polypropylene tufts, at least one polyolefin backing and a styrene-butadiene rubber adhesive.

9. A process in accordance with claim 1 conducted in the absence of a separately added compatabilizer.

* * * * *

UNITED STATES PATENT AND TRADEMARK OFFICE
CERTIFICATE OF CORRECTION

PATENT NO. : 5,498,667
DATED : Mar. 12, 1996
INVENTOR(S) : Donald J. David, et al.

It is certified that error appears in the above-indentified patent and that said Letters Patent is hereby corrected as shown below:

On the title page, after item [73], insert the following:

--The term of this patent shall not extend beyond the expiration date of Pat. No. 5,294,384.--

Signed and Sealed this

Eleventh Day of February, 1997

Attest:

BRUCE LEHMAN

*Attesting Officer*   *Commissioner of Patents and Trademarks*